Nov. 17, 1942.  T. F. SPACKMAN ET AL  2,302,397
UNIVERSAL DEFROSTER CONNECTION
Filed Dec. 30, 1940  2 Sheets-Sheet 2
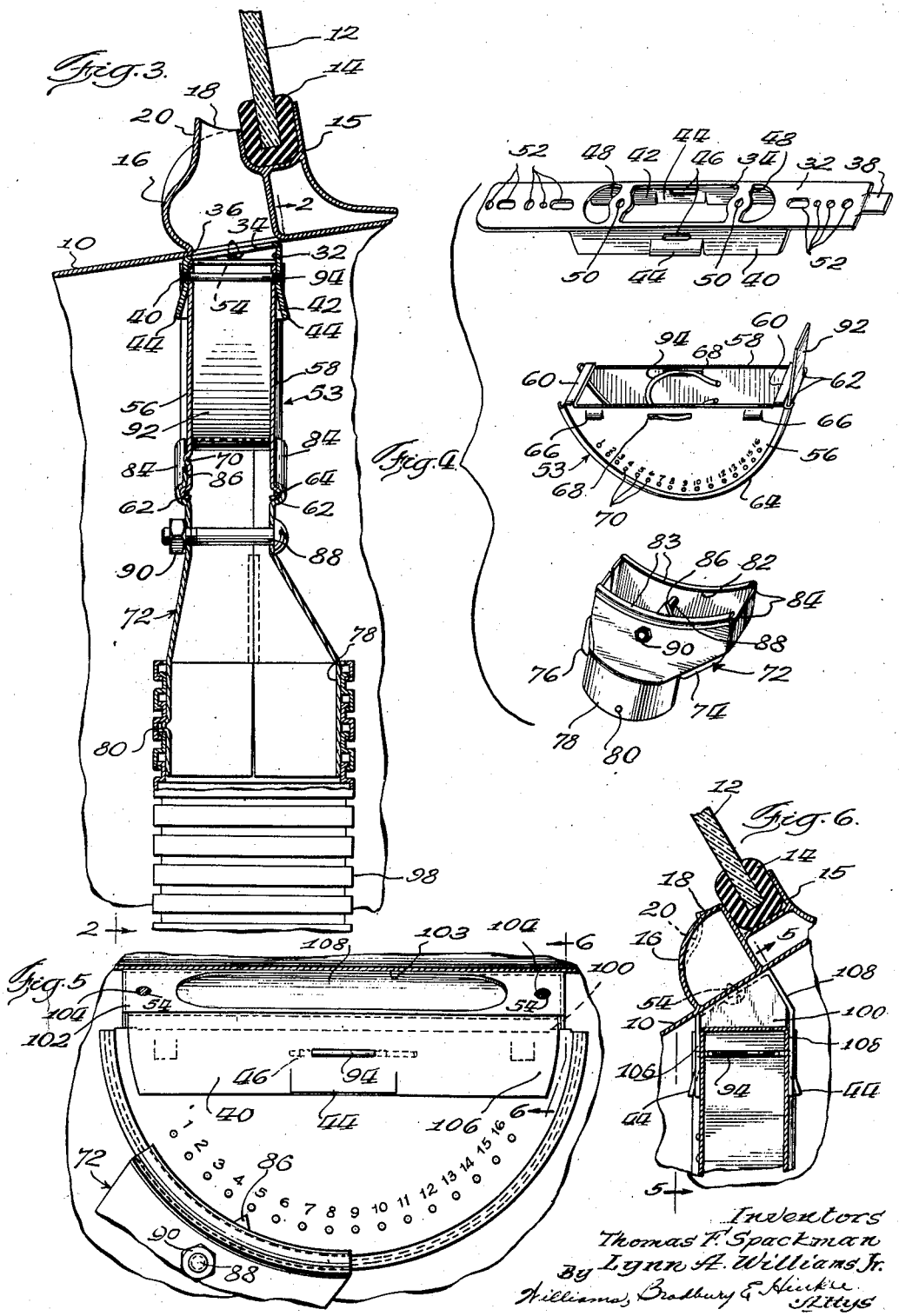

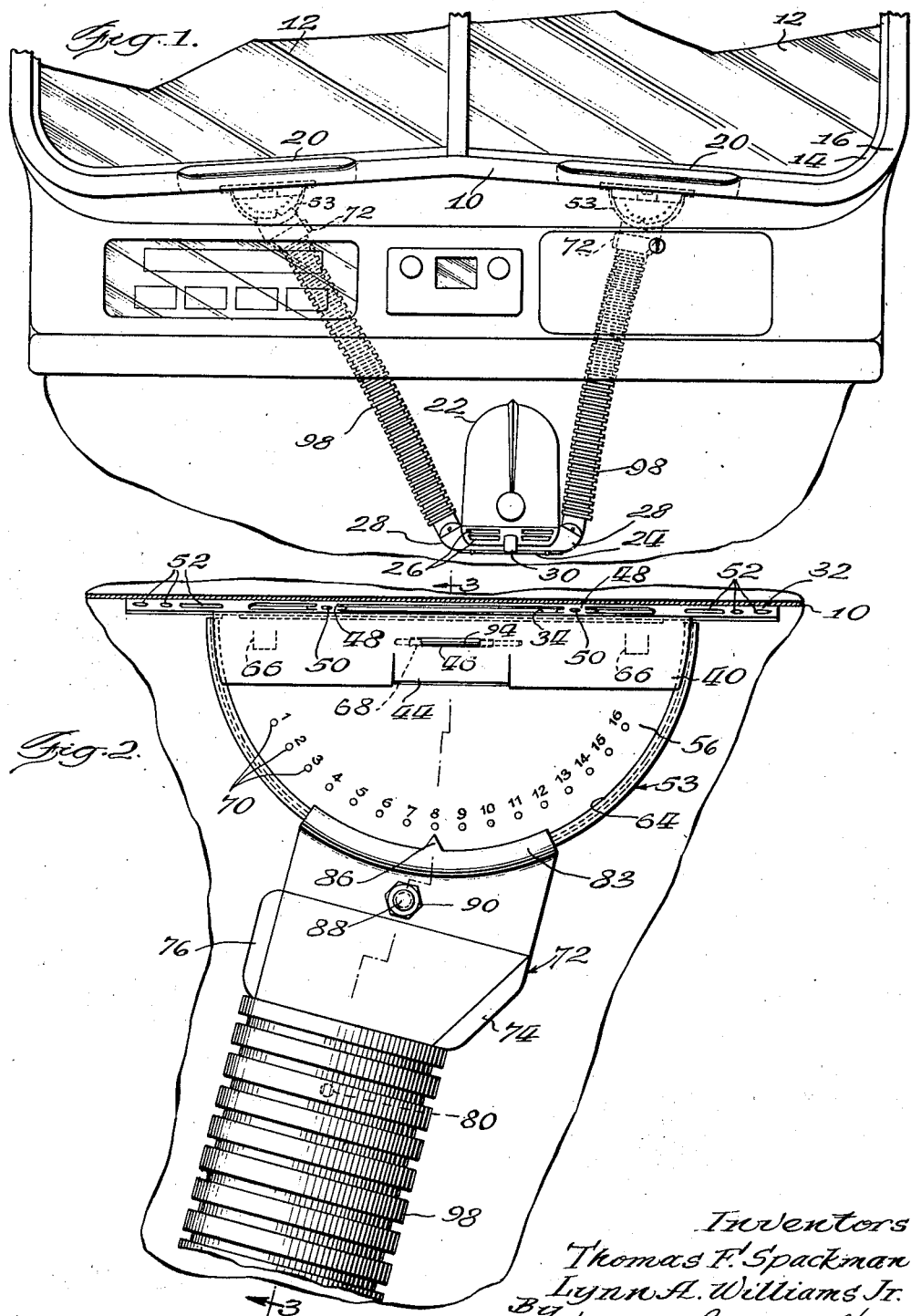

Patented Nov. 17, 1942

2,302,397

UNITED STATES PATENT OFFICE 2,302,397

UNIVERSAL DEFROSTER CONNECTION

Thomas F. Spackman, Chicago, and Lynn A. Williams, Jr., Winnetka, Ill., assignors to Stewart-Warner Corporation, Chicago, Ill., a Corporation of Virginia Application December 30, 1940, Serial No. 372,286

13 Claims. (Cl. 20—40.5)

This invention relates generally to a windshield defroster for automotive vehicles, and more particularly to an apparatus in which defrosting and vaporizing of moisture on the windshield is accomplished by directing some or all of the air flowing from the heater of the automotive vehicle against the inner side of the windshield.

An object of the invention is the provision of improved means for conducting air from the heater of an automotive vehicle to the interior of the windshield moulding and out through openings in the moulding along the base of the windshield and against the inner surface of the windshield for defrosting the same or evaporating the moisture from the windshield.

Another object of the invention is the provision of improved means for proportioning the air flowing from the heater of the automotive vehicle so that a part or all of such air may be directed against the windshield.

Another object of the invention is the provision of a windshield defrosting and defogging apparatus which is adaptable for use on any make or model of automobile and is so constructed that it may be attached to the air outlets commonly provided in the instrument panel and the windshield moulding along the base of the windshield on standard makes of automobiles without alteration of the apparatus or outlets.

Another object of the invention is the provision of a windsield defrosting apparatus for an automotive vehicle in which conduits leading from the heater are connected by a housing and nozzle assembly to a mounting plate secured to outlets at the base of the windshield, the nozzle being so constructed that it may be attached to the housing at various angles about the periphery of the housing.

Another object of the invention is the provision of a windshield defrosting apparatus for an automotive vehicle with conduits leading from the automobile heater, having a housing and nozzle assembly for connecting the conduits to the air outlets at the base of the windshield and providing these parts with means for indicating the proper angle at which these parts are to be assembled.

Another object of the invention is the provision in a defrosting apparatus for automotive vehicles of a universal mounting plate which is so constructed that it may be attached to the defroster outlet openings along the base of the windshield of any standard make of automotive vehicle and to which conduits leading from the heater may be removably attached by means of a housing and nozzle assembly.

Other objects will appear from the following description, reference being had to the accompanying drawings, in which:

Fig. 1 is a diagrammatic view of part of the interior of an automobile, showing the instrument panel, heater, windshield and defrosting apparatus as they appear from the front seat;

Fig. 2 is an enlarged elevation of the housing and nozzle assembly attached to the mounting plate;

Fig. 3 is a sectional view taken on the line 3—3 of Fig. 2;

Fig. 4 is an exploded view in perspective of the universal mounting plate, housing, and nozzle;

Fig. 5 is a view of a modification partly in section taken on the line 5—5 of Fig. 6 and showing the housing and nozzle assembly in elevation;

Fig. 6 is a fragmentary sectional view of the modification taken on the line 6—6 of Fig. 5.

In Figs. 1, 2, and 3 is shown a part of the interior of an automobile having an instrument panel 10, a windshield 12 resting in a rubber sealing gasket 14 which is held in position by a windshield moulding 16 and the upwardly turned edge 15 of the cowl of the automobile. Two openings 18 along the forward edge of the base moulding 16 are formed by bending the moulding upwardly, the raised parts forming deflectors 20 for directing air against the windshield.

A suitable heater 22 for heating the passenger compartment is mounted upon the dashboard of the automobile and has an adapter 24 mounted over its outlet. Heated air passes from the heater to the passenger compartment through openings 26 in the adapter which also has an elbow 28 projecting from each of its sides. A deflector in the adapter 24 is adjustable by a handle 30 for proportioning the heated air forced from the heater through the adapter and that forced through the elbow pipes 28, so that varying quantities may flow out of each, or substantially all the air may be directed through the elbows, or substantially all of it may be directed into the passenger compartment.

A generally rectangular universal mounting plate 32 is secured by self-tapping screws beneath the horizontal portion of the instrument panel 10 and has a centrally located opening 34 therein forming an elongated aperture which registers with an opening 36 in the top of the instrument panel and communicates with the openings 18 in the windshield moulding. The mounting plate 32 (Fig. 4) may be stamped from sheet metal and has a lug 38 projecting from one end, and downwardly extending flanges 40 and 42 formed integrally with the lateral edges of the plate intermediate its ends. The flanges 40 and 42 lie in parallel planes, the flange 42 forming an acute angle with the plate, while the corresponding angle of the flange 40 is obtuse, thereby causing these flanges to lie substantially in a vertical plane, as shown in Fig. 3.

Along the lower side of each flange a part thereof intermediate the ends is struck outwardly at an acute angle from the sides of the flange and forms guides 44 on the flanges. Centrally located near the top edge of each flange and directly opposite each other, elongated openings 46 are stamped into each flange.

The opening 34 in the plate 32 is spanned by two cross-bars 48 which have centrally located holes 50 therein. A series of screw receiving apertures 52 are located on the center line of the plate at each end of the plate. Some of these apertures are circular in shape and of different sizes while others are elongated. Self-tapping screws 54 by which the plate 32 is secured beneath the upper portion of the instrument panel 10 pass through a pair of these apertures 52 or through the holes 50 in the cross-bars 48. The pair of apertures through which the screws are passed will depend on the model and make of car upon which the defroster is installed, the apertures being so arranged that for any model or make of car one pair of apertures will be found suitable.

A housing and nozzle assembly is detachably secured to the mounting plate. The housing 53 may be stamped as a unit from sheet metal and comprises two generally parallel semi-circular plates 56 and 58 having a diameter slightly greater than the length of the flanges 40 and 42 on the mounting plate 32. The diametrical edges of the plates are joined by cross-bars 60 which are of a length equal to the distance between the flanges 40 and 42 on the mounting plate. The outer peripheral edge of each plate is formed to provide a channel 62 on the inner side and a ridge 64 on the outer side concentric with the outer periphery. The plates are also provided with detents 66 struck outwardly near the diametrical edges thereof and elongated slots 68 parallel to the diametrical edges and spaced short distances therefrom. The outer side of plate 56 is provided with a series of slightly raised projections 70 forming numbered graduations along an arc concentric with the periphery of the plate, and serve as guides in assembling and installing the apparatus.

The nozzle 72, which is adjustably secured to the housing 53, is formed of sheet metal and consists of two parts each having flanges 74 and 76 on their opposite edges which are spot welded or otherwise suitably secured together. The nozzle has a tubular inlet portion 78 which fits snugly in a flexible conduit leading to the heater and has a projection 80 near its outer end to prevent the conduit from slipping from the nozzle.

The other end of the nozzle is flared outwardly to form a mouth 82 of rectangular cross-section. The longer sides of the mouth have concave edges 83 which are crimped to form channels 84 on the inner sides thereof, which are complementary to the ridges 64 on the semi-circular plates 56 and 58. Midway between its ends, the concave edge of the nozzle is provided with a pointer 86 for cooperation with the graduations 70 on the housing.

To assemble the nozzle on the housing it is merely necessary to force the channeled concave edges 84 of the mouth over the edges of the plates until the ridges 64 on the outer surfaces of the housing engage in the concave channels 84 formed in the sides of the mouth. A bolt 88 which passes through the nozzle near its concave edge has a nut 90 which may be tightened against the top side of the nozzle for clamping the nozzle at any desired position on the periphery of the housing.

Each nozzle and housing assembly is supplied with a spacer strip 92 of light sheet metal for closing the curved open sides of the housing. After the nozzle has been set at the desired position on the periphery of the housing 53 the strip 92 is inserted from one side of the housing in the channels 62. The strip is slid into position with one end flush with the side of the nozzle. The balance of the strip is cut off at the diametrical edge of the housing and inserted in the channels on the opposite side of the housing. When the pointer 86 is set at either the first or the last position indicated on the top of the housing it is necessary to insert the metal strip 92 from one side only since the opposite side of the housing is covered by the mouth of the nozzle. When the nut 90 is tightened the nozzle is clamped firmly to the edges of the housing and the spacer strips are securely held in the channels of the housing. A unit is thus formed from which very little air can escape except through the desired openings.

For attaching the nozzle and housing assembly to the mounting plate 32 a split ring latching detent or lock 94 of resilient metal is provided. Diametrically opposite portions of the ring 94 project through the slots 68 in the plates 56 and 58, and when the housing is inserted between the flanges of the mounting plate the guides 44 on the flanges bear against the portions of the ring projecting through the slots in the plates, and as the housing is pushed upwardly between the flanges the sides of the ring are pushed inwardly. When the housing is in its uppermost position portions of the ring snap into the elongated openings 46 in the sides of the flanges 40, and detachably secure the nozzle and housing assembly to the mounting plate.

The nozzle and housing are connected to the heater of the automotive vehicle by a flexible conduit 98 one end of which is forced over the tubular end 78 of the nozzle and is held thereon by the projection 80. The other end of the conduit is attached by suitable means to one of the elbows 28 projecting from the sides of the adapter 24 on the heater 22.

In Figs. 5 and 6 is shown a form of the invention having a modified mounting plate 100 which is adaptable for mounting on certain makes of automobiles upon which the mounting plate previously described cannot be secured. This modified mounting plate has a rectangular shaped face 102 with a centrally located opening 103 therein forming an elongated aperture which registers with the openings in the instrument panel of the automobile and is in communication with the openings 18 in the windshield moulding 16. The mounting plate 100 is secured to the instrument panel by self tapping screws 54 which pass through apertures 104 at each end of the face 102.

The inclination of the face of the mounting plate 100 is about 30° which is much greater than the inclination of the plate 32 previously described. Flanges 106 and 108 project downwardly from the side edges of the plate, the flange 108 which is ordinarily mounted toward the front end of the car being bent at an angle of 90° to the face plate and having a second bend therein which brings the lower part of the flange into a plane parallel with the plane of the flange 106. The flanges 106 and 108 are provided with guides 44 struck from the sides thereof and openings 46 opposite each other for receiving the edges of a ring lock 94. The housing and nozzle assembly shown in Figs. 5 and 6 are similar in all respects to that shown in the other figures of the drawings and previously described.

In stalling the defrosting apparatus the mounting plate 32 is first secured to the instrument panel 10 with the centrally located opening 34 registering with the opening in the instrument panel and in communication with the openings 18 in the windshield moulding which openings are provided on most standard late model automobiles. Two self tapping screws 54 may be used to attach the mounting plate 32 to the instrument panel. The apertures through which the screws are to pass is determined by experiment because different apertures are used with different models and makes of automobiles due to the constructional differences therein. In some the screw may be passed through the holes 50 in the cross bars 48 while in others they will have to be passed through one of the various apertures 52 in each end of the plate. In some automobiles it is necessary to use the lug 36 on the end of the mounting plate 32 for supporting one end of the mounting plate. When this is done the lug is engaged with one end of the opening in the instrument panel and the opposite end of the plate is secured by a screw.

The proper manner of securing the mounting plates to the various standard makes and models of automobiles on the market may be compiled in a table which may be included with each defroster sold for guidance in installing the defroster.

The proper angles at which the right and left hand nozzles should be set in order that conduits 98 will clear the wires, instruments and other obstructions behind the instrument panel is determined for each model and make of automobile, and a table containing this information is included with each defroster sold, for the guidance of the mechanic in installing the defroster.

When the pointer 86 has been set at the proper point the sides of the housing are closed by inserting the spacer strip 92 in the channels 62 in the peripheral edge of the housing and the nozzle is clamped in position by tightening the nut 90.

After attaching the housings to their mounting plates conduits can be cut to proper lengths and used to connect the nozzles with the elbows 23 of the adapter 24.

By adjusting the deflector in the adapter 24 attached to the heater the operator may control the proportion of the heated air which is forced through the conduits 98 to the openings 18 in the windshield moulding. The deflectors 20 on the windshield moulding direct the heated air against the windshield and cause any moisture thereon to be evaporated. When the windshield is heavily coated with ice all the air forced from the heater may be directed against the windshield until it has been cleared whereupon the amount of air flowing to the windshield may be reduced. In ordinary cold weather driving only a part of the air flowing from the heater will be needed to keep the windshield clear.

A low production cost for the defroster connection is possible not only because it is simple in construction and may be made from inexpensive materials, but also because standardization in manufacture is possible. The location and arrangement of defroster outlet openings vary greatly in the different makes and models of automobiles, but the defroster connection disclosed herein may be adjusted readily for installation on any automobile, thus eliminating the high cost and inconvenience which would be encountered if it were necessary to supply a large number of different types of connections.

While we have shown and described a specific embodiment of a defrosting apparatus which is adaptable for use on all standard makes and models of automobiles, it will be apparent to those skilled in the art that variations and modifications thereof may be made without departing from the essential features of the invention set forth in the accompanying claims. We therefore desire, by these claims, to include as our invention all such modifications and variations by which substantially the same results are secured in substantially the same way.

We claim:

1. A conduit fitting for making a connection between a heated air supplying hose and a defroster outlet in the windshield moulding of an automobile, comprising an apertured mounting plate having means for facilitating its attachment to the windshield moulding around the defroster opening therein, a pair of relatively swiveled conduit elements, co-operating means on one of said elements and on said mounting plate for detachably securing said pair of elements to said mounting plate, means on the other of said conduit elements for receiving the end of the heated air supplying hose, and means for clamping said elements together to prevent relative movement therebetween.

2. The combination set forth in claim 1 in which said pair of elements is provided with co-operating means indicating their relative angular positions, whereby for installation on a particular automobile said elements may be clamped together in relative positions predetermined by the peculiar constructional features of that automobile and attached to said mounting plate without further adjustment.

3. The combination set forth in claim 1 in which one of said elements comprises a unitary stamping having a pair of interconnected parallel spaced generally semi-circular plates, each having its semi-circular edge portion beaded to form external ridges and opposed internal grooves, the other of said elements comprising means engaging the edge portions only of said plates, cylindrical wall means closing the space between said plates not covered by said other element, said wall means being held in said opposed grooves and holding said plates apart, and means to clamp said other element to said first-named element.

4. The combination set forth in claim 1 in which said co-operating means includes a single spring forming a pair of latching detents.

5. The combination set forth in claim 1 in which said co-operating means includes a spring detent, and in which said mounting plate has downwardly extending flanges provided with slots to receive said spring detent.

6. The combination set forth in claim 1 in which the axis of relative swiveling movement of said elements is spaced an appreciable distance from one of said elements.

7. A windshield defroster connection for automotive vehicles having a heated air supplying hose, a windshield, and a windshield moulding having defroster outlet openings at the base of the windshield, comprising a mounting plate having a centrally located opening and a series of apertures for receiving mounting screws, said apertures being arranged to permit mounting of said plate on any standard automotive vehicle by the selective use thereof with the opening therein in communication with a defroster outlet opening, a semi-cylindrical housing removably secured to said mounting plate, and a nozzle having one end adapted to be clamped at various angular positions along the curved edges of said housing in substantially air-tight relation therewith and having means on its opposite end for receiving said heated air supplying hose.

8. In an automotive vehicle having a heated air supplying hose, a windshield, a moulding fashioned to receive air secured to the body of said automotive vehicle at the inner side of said windshield, and outlet openings in said moulding at the base of said windshield, the combination of a mounting plate having a centrally located opening and screw receiving apertures arranged to permit mounting of said plate on any standard automotive vehicle with said opening in communication with the outlet opening in said moulding, a semi-cylindrical housing removably secured to said mounting plate, ridges on the semi-circular edges of said housing, and a nozzle having a tubular end for receiving said heated air supplying hose and a rectangular shaped mouth, said mouth having beaded edges slidably maintained on the ridges on said housing.

9. In a windshield defrosting connection for use on standard automotive vehicles having a heated air supplying hose and a windshield with outlet openings for air along the base thereof, the combination of a flanged mounting plate adapted to be secured below said openings and having an aperture therein in communication with said outlet opening, an open sided semi-cylindrical housing removably secured to the flanges of said mounting plates, a nozzle having one of its ends adjustably secured on the open sides of said housing and its opposite end connected to said heated air supplying hose, and a spacer strip in said housing for closing the open sides thereof not covered by said nozzle.

10. A windshield defroster connection for use on standard automotive vehicles, having a heated air supplying hose, a windshield and a defroster outlet opening at the base of the windshield, comprising a flanged mounting plate adapted to be secured around said defroster outlet opening and having a centrally located opening in communication with said outlet opening, a parallel sided semi-circular housing having external ridges formed on its semi-circular edges, a nozzle having a tubular end for receiving said heated air supplying hose and a mouth slidably engaging said external ridges, and resilient locking means for removably securing said housing to the flanges of said mounting plate.

11. A windshield defrosting system for automotive vehicles having a heated air supplying hose, a windshield, and a defroster outlet opening at the base of the windshield, comprising a flanged mounting plate having a centrally located opening and a series of screw receiving apertures arranged to provide means for mounting said plate on any standard automotive vehicle by the selective use thereof with said opening in communication with said outlet opening, a parallel sided semi-circular housing having its semi-circular edges beaded to form opposed channels on the inner surfaces thereof and external ridges on the outer surfaces thereof, a nozzle having a tubular end for receiving said heated air supplying hose and a mouth with beaded concave edges for adjustably clamping said mouth over said external ridges, a spacer strip fitting in the channels of said housings for closing the open semicircular sides thereof not covered by said nozzle, and a resilient lock for removably securing said housing to the flanges of said mounting plate.

12. A windshield defroster connection for automotive vehicles having a heated air supplying hose, a windshield and right and left defroster outlet openings at the base of the windshield, comprising a flanged mounting plate having means selectively adapting said plate to be secured adjacent either outlet opening, said plate having an opening located to register with either outlet opening when said plate is secured in position, an open sided semi-circular housing having its semi-circular edges beaded to form annular ridges on the outside surfaces and opposed annular channels on the inside surfaces thereof, resilient locking means for removably securing said housing to the flanges of said mounting plate, a nozzle having a tubular end for receiving said heated air supplying hose and a mouth adapted to be adjustably clamped over said annular ridges, a spacer strip slidably received in the channels of said housing for closing the open semi-circular sides thereof not covered by said nozzle, and means for securely clamping said nozzle on said housing and for holding said housing, spacer strip and nozzle in substantially airtight relation.

13. A windshield defroster connection for automotive vehicles, having a heated air supplying hose, a windshield and defroster outlet openings at the base of the windshield, comprising a flanged mounting plate having a centrally located opening and means selectively adapting said plate for securement below said outlet openings with its opening in communication therewith, a semi-circular housing having annular ridges on its peripheral edges, indicia on one side of said semi-circular housing, a spring lock for removably securing said housing to the flanges of said mounting plate, a nozzle having a tubular end for receiving said heated air supplying hose and an end flared to form a mouth, said mouth having channeled edges adapted to slidably engage said annular ridges, a pointer on one of said edges for registering on the indicia of said housing to indicate the relative angular position of said nozzle, and means for clamping the channeled edges of said nozzle over the annular ridges of said housing to secure said nozzle in a fixed position on said housing.

THOMAS F. SPACKMAN.
LYNN A. WILLIAMS, Jr.